United States Patent
Iijima et al.

(10) Patent No.: US 6,475,409 B2
(45) Date of Patent: Nov. 5, 2002

(54) METHOD OF MANUFACTURING SYNTHESIS GAS

(75) Inventors: Masaki Iijima, Tokyo (JP); Kazuto Kobayashi, Tokyo (JP); Kazuhiro Morita, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/801,718

(22) Filed: Mar. 9, 2001

(65) Prior Publication Data

US 2002/0025987 A1 Feb. 28, 2002

(30) Foreign Application Priority Data

Aug. 16, 2000 (JP) .................................. 2000-246912

(51) Int. Cl.$^7$ ........................... C07C 1/02; C01B 3/26; C01B 31/18
(52) U.S. Cl. .................. 252/373; 423/651; 423/418.2
(58) Field of Search ........................ 252/373; 423/651, 423/418.2

(56) References Cited

U.S. PATENT DOCUMENTS 6,218,439 B1 * 4/2001 Kobayashi et al. ......... 518/713

OTHER PUBLICATIONS

Goff et al., Chemical Engineering Progress, pp. 46–53, Aug. 1987.*

* cited by examiner

Primary Examiner—Jafar Parsa
(74) Attorney, Agent, or Firm—Wenderoth, Lind & Ponack, L.L.P.

(57) ABSTRACT

A method of manufacturing a synthesis gas, which makes use of a synthesis plant comprising a reformer having a steam reforming reaction tube, a combustion radiation portion provided around the reaction tube, for heating the reaction tube, and a convection portion communicating the combustion radiation portion. A steam-containing natural gas is prepared by adding stream to a natural gas. The steam-containing natural gas is preheated by passing the natural gas through a convection portion of reformer, the natural gas preheated being subsequently fed to the reaction tube. After being preheated in the convection portion, carbon dioxide is fed to the reaction tube, thereby producing a synthesis gas containing hydrogen and carbon monoxide.

18 Claims, 3 Drawing Sheets

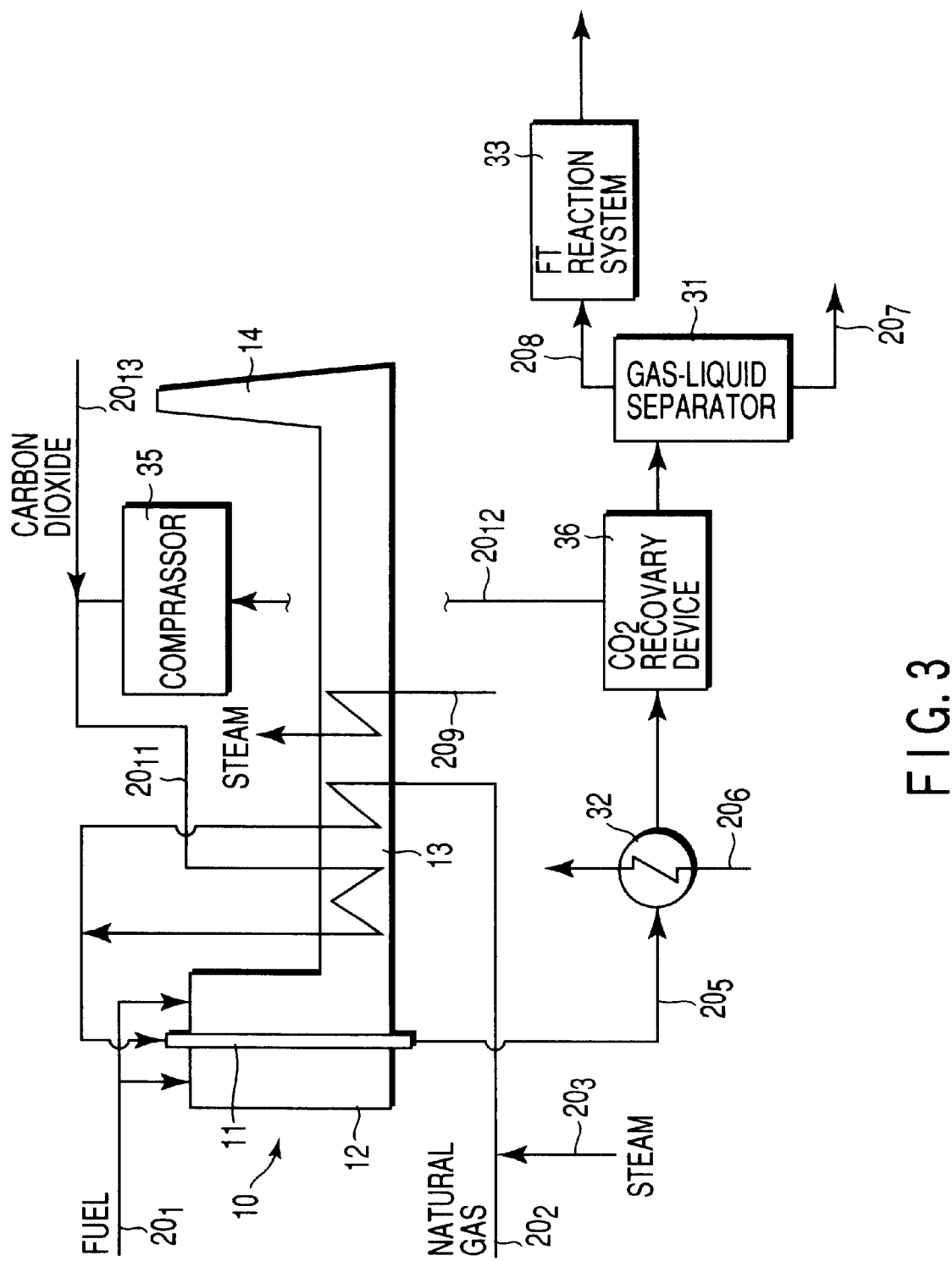
F I G. 3

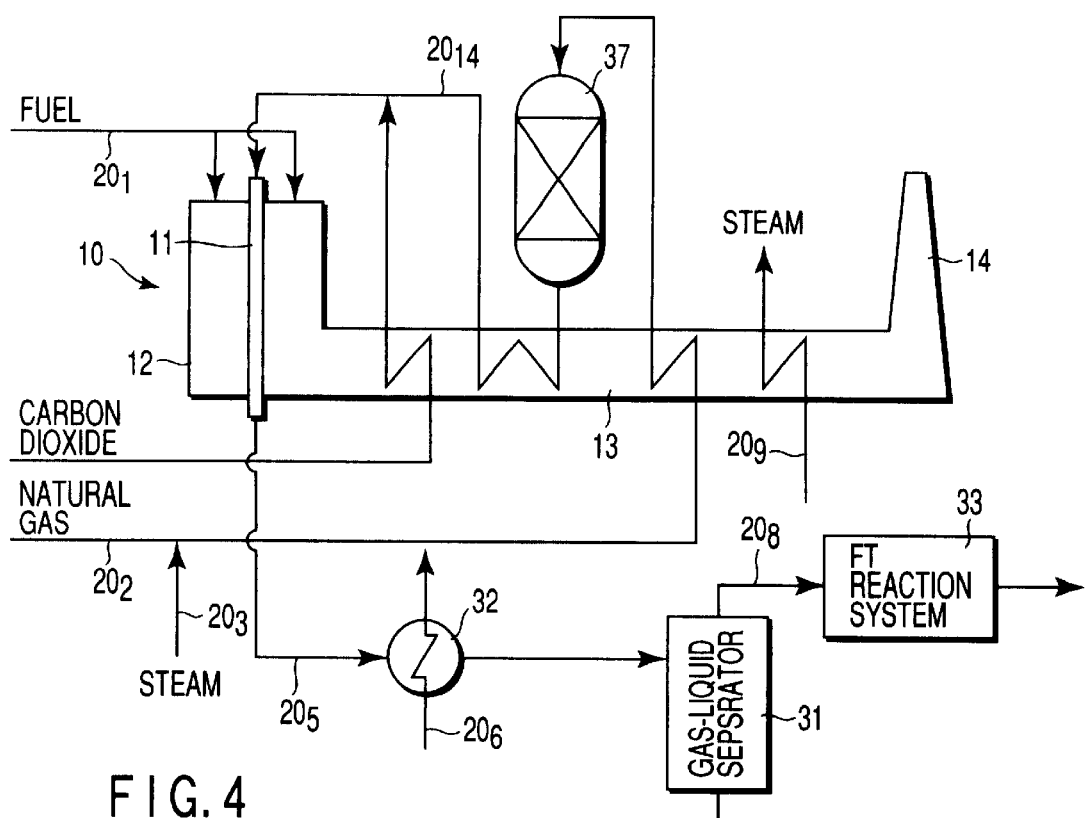
F I G. 4
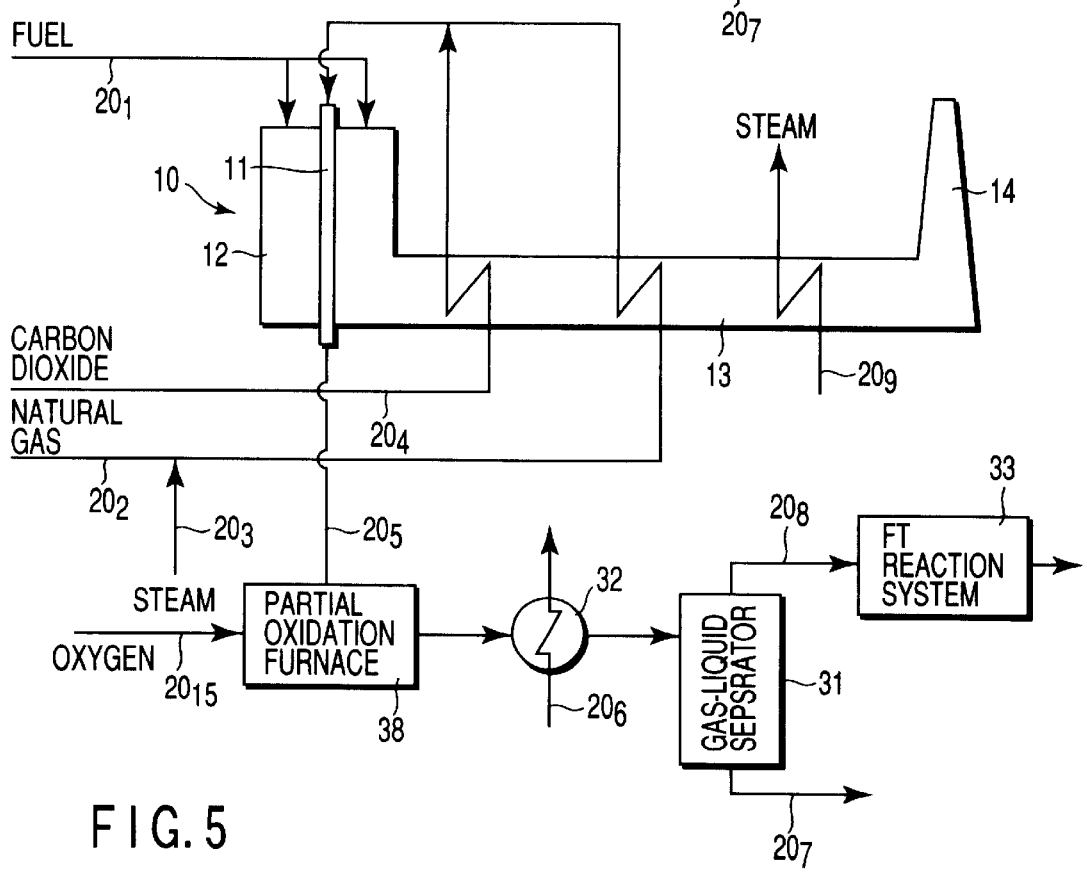
F I G. 5

METHOD OF MANUFACTURING SYNTHESIS GAS

CROSS-REFERENCE TO RELATED APPLICATIONS

This application is based upon and claims the benefit of priority from the prior Japanese Patent Application No. 2000-246912, filed Aug. 16, 2000, the entire contents of which are incorporated herein by reference.

BACKGROUND OF THE INVENTION

This invention relates to a method of manufacturing a synthesis gas to be employed for the synthesis of gasoline, methanol or dimethyl ether by way of the GTL (Gas to Liquid) process.

A synthesis gas comprising hydrogen ($H_2$) and carbon monoxide (CO) is employed as a raw material for the synthesis of gasoline, etc. by way of a GTL (Gas to Liquid) process according to the Fisher-Tropsch reaction system.

This synthesis gas has been conventionally manufactured by the following method.

Namely, by making use of a synthesis gas plant provided with a reformer comprising a steam reforming reaction tube, a combustion radiation portion disposed around the reaction tube for heating the reaction tube through the combustion of fuel, and a convection portion communicated with the combustion radiation portion, steam and carbon dioxide are added to a natural gas employed as a raw gas to prepare a mixed gas, which is then passed through the convection portion so as to be preheated to a predetermined temperature. The resultant preheated mixed gas is then fed to the reaction tube so as to steam-reform the natural gas together with carbon dioxide, thereby manufacturing the synthesis gas containing hydrogen ($H_2$) and carbon monoxide (CO). Since the temperature of the reaction tube to be heated by the combustion radiation portion can be reduced due to the preheating of this mixed gas, this preheating would contribute to a reduction of the fuel consumption.

However, if the natural gas incorporated with steam and carbon dioxide is preheated to a temperature of 550 to 600° C. or more at the convection portion of the reformer according to the conventional method, hydrocarbons of $C_2$ (ethane) or more of the natural gas are caused to thermally decompose, thereby generating carbon. The carbon thus generated tends to adhere onto the inner wall of the natural gas-preheating portion (pipeline) to thereby deteriorate the heat exchanging performance of the pipeline and hence deteriorating heat exchanging rate.

Further, if the surface temperature of the preheating portion is raised higher, the preheating portion may be possibly damaged. Additionally, if the carbon thus generated is allowed to inter into the catalyst layer incorporated in the reaction tube of reformer and located on a downstream side of the preheating portion, the catalyst layer may be clogged, thereby badly affecting the reaction and heat transfer, or under some circumstances, the catalyst as well as the reaction tube may be possibly damaged.

Therefore, in order to avoid a wasteful consumption of natural gas on the occasion of preheating a natural gas incorporated with steam and carbon dioxide at the convection portion of the reformer, it is required in the conventional manufacture method of synthesis gas to control the preheating temperature to less than 560° C. As a result, it is difficult according to the conventional method to reduce the fuel consumption of the reformer and to effectively carry out the recovery of heat at the convection portion.

BRIEF SUMMARY OF THE INVENTION

Therefore, an object of this invention is to provide a method for manufacturing a synthesis gas, which makes it possible to feed a natural gas incorporated with steam and carbon dioxide and preheated to a relatively high temperature to a reformer, thereby making it possible to save the fuel consumption of the reformer and to effectively utilize the waste heat of the reformer.

Namely, this invention provides a method of manufacturing a synthesis gas by using a synthesis plant comprising a reformer having a steam reforming reaction tube, a combustion radiation portion provided around the reaction tube, for heating the reaction tube by combusting fuel, and a convection portion communicating the combustion radiation portion, the method comprising the steps of;

adding steam to a natural gas to prepare a stream-containing natural gas;

passing the stream-containing natural gas through the convection portion of the reformer, thereby preheating the stream-containing natural gas;

preheating carbon dioxide by passing the carbon dioxide through the convection portion of the reformer; and feeding the stream-containing natural gas preheated and the carbon dioxide preheated to the reaction tube, thereby producing a synthesis gas containing hydrogen and carbon monoxide.

This invention further provides a method of manufacturing a synthesis gas by using a synthesis plant comprising a reformer and a preliminary reformer which is provided on the upstream side of the reformer, the reformer comprising a steam reforming reaction tube, a combustion radiation portion provided around the reaction tube, for heating the reaction tube by combusting fuel, and a convection portion communicating the combustion radiation portion, and the method comprising the steps of;

adding steam to a natural gas to prepare a stream-containing natural gas;

passing the stream-containing natural gas through the convection portion of the reformer, thereby preheating the stream-containing natural gas;

feeding the stream-containing natural gas preheated via the preliminary reformer to the reaction tube;

preheating carbon dioxide by passing the carbon dioxide through the convection portion of the reformer; and feeding the carbon dioxide preheated via a passageway, which is located between the reaction tube and the preliminary reformer and passed the stream-containing natural gas preheated, to the reaction tube, thereby producing a synthesis gas containing hydrogen and carbon monoxide.

This invention also provides a method of manufacturing a synthesis gas by using a synthesis plant comprising a reformer and a partial oxidation furnace which is provided on the downstream side of the reformer, the reformer comprising a steam reforming reaction tube, a combustion radiation portion provided around the reaction tube, for heating the reaction tube by combusting fuel, and a convection portion communicating the combustion radiation portion, and the method comprising the steps of;

adding steam to a natural gas to prepare a stream-containing natural gas;

passing the stream-containing natural gas through the convection portion of the reformer, thereby preheating the stream-containing natural gas;

preheating carbon dioxide by passing the carbon dioxide through the convection portion of the reformer;

feeding the stream-containing natural gas preheated and the carbon dioxide preheated to the reaction tube, thereby producing a synthesis gas containing hydrogen and carbon monoxide;

introducing the synthesis gas into the partial oxidation furnace; and introducing gas containing oxygen into the partial oxidation furnace, thereby allowing a reaction to take place between the synthesis gas and the oxygen.

In each of the manufacturing methods of a synthesis gas described above, it would be possible to employ carbon dioxide that has been recovered from the combustion waste gas generated at the combustion radiation portion of the reformer.

It is also possible to employ the carbon dioxide recovered from the synthesis gas produced on a downstream side of the reformer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

BRIEF DESCRIPTION OF THE DRAWINGS

Figure 1:
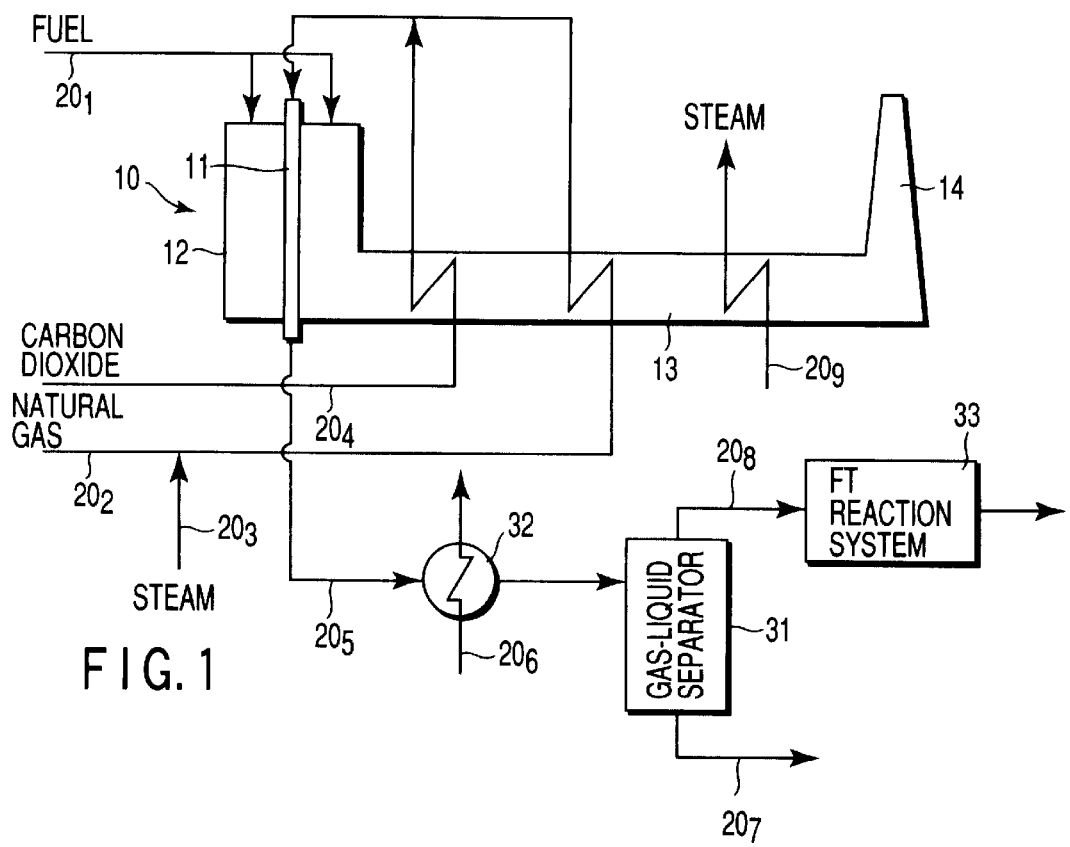
Figure 2:
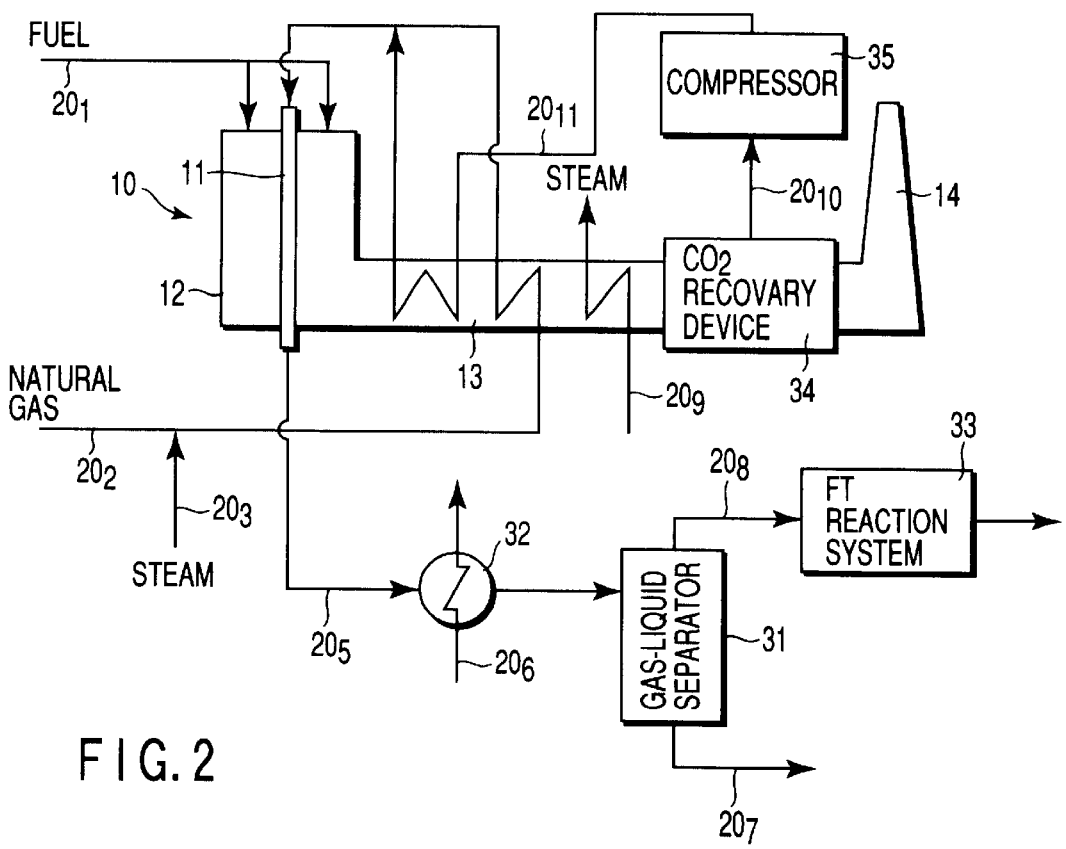

FIG. 1 is a flow chart illustrating main manufacturing steps of synthesis gas in a synthesizing plant of gasoline, kerosene and gas oil, which can be employed according to a first Embodiment of this invention;

FIG. 2 is a flow chart illustrating main manufacturing steps of synthesis gas in a synthesizing plant of gasoline, kerosene and gas oil, which can be employed according to a second Embodiment of this invention;

FIG. 3 is a flow chart illustrating main manufacturing steps of synthesis gas in a synthesizing plant of gasoline, kerosene and gas oil, which can be employed according to a third Embodiment of this invention;

FIG. 4 is a flow chart illustrating main manufacturing steps of synthesis gas in a synthesizing plant of gasoline, kerosene and gas oil, which can be employed according to a fourth Embodiment of this invention; and FIG. 5 is a flow chart illustrating main manufacturing steps of synthesis gas in a synthesizing plant of gasoline, kerosene and gas oil, which can be employed according to a fifth Embodiment of this invention.

DETAILED DESCRIPTION OF THE INVENTION

Next, the method of manufacturing a synthesis gas (which is suited for use in synthesizing gasoline, kerosene and gas oil) will be explained with reference to drawings.
(First Embodiment)

FIG. 1 is a flow chart illustrating a main portion of the synthesizing plant of gasoline, kerosene and gas oil, which can be employed in the manufacture of a synthesis gas according to the first Embodiment.

Referring to FIG. 1, a reformer 10 comprises a reaction tube 11 adapted to be employed for steam reforming, a combustion radiation portion 12 disposed around the reaction tube 11 and designed to heat the reaction tube through the combustion of fuel, and a chimney 14 which is communicated via a convection portion (waste heat recovering portion) 13 with the combustion radiation portion 12. The reaction tube 11 is filled therein with a nickel-based catalyst for instance. A fuel-introducing passageway $20_1$ is communicated with the combustion radiation portion 12 of the reformer 10.

A raw gas-introducing passageway $20_2$ is communicated via a convection portion 13 of the reformer 10 with an upper end of the reaction tube 11. This raw gas-introducing passageway $20_2$ may be provided with a desulfurizer (not shown). A steam-introducing passageway $20_3$ is communicated with the raw gas-introducing passageway $20_2$ which is positioned on the upstream side of the convection portion 13. A carbon dioxide-introducing passageway $20_4$ is disposed so as to pass through a region of the convection portion 13 in the vicinity of the combustion radiation portion 12 of the reformer 10 (i.e. a high temperature region within the convection portion 13) and then, to communicate with a portion of the raw gas-introducing passageway $20_2$ which is located downstream relative to the convection portion 13 with which the raw gas-introducing passageway $20_2$ is intersected. Preferably, this carbon dioxide-introducing passageway $20_4$ is disposed so as to be communicated with a portion of the raw gas-introducing passageway $20_2$ which is located in the vicinity of the inlet port of the reaction tube 11.

A lower end of the reaction tube 11 of the reformer 10 is communicated via a passageway $20_5$ with a gas-liquid separator 31. This passageway $20_5$ is provided with a heat exchanger 32. This heat exchanger 32 is intersected with a passageway $20_6$ so as to heat for example a boiler water passing through this passageway $20_6$, thereby generating a high-pressure steam. The water separated by the gas-liquid separator 31 is allowed to be discharged out of the reformer 10 through a passageway $20_7$. The gas (synthesis gas) separated by the gas-liquid separator 31 is allowed to enter via a passageway $20_8$ into the Fisher-Tropsch (FT) reaction system 33 which is filled with a cobalt-based catalyst for instance. By the way, the catalyst to be filled in this FT reaction system 33 may not be confined to the cobalt-based catalyst but may be an iron-based catalyst for instance.

A passageway $20_9$ for flowing a boiler water for instance is intersected with the convection portion 13 of the reformer 10, thereby allowing the combustion exhaust gas of the convection portion 13 to be heat-exchanged with the boiler water. As a result, the combustion exhaust gas is cooled and at the same time, the boiler water itself is heated, thereby generating a high-pressure steam.

Next, the method of manufacturing a synthesis gas will be explained with reference to the aforementioned synthesizing plant shown in FIG. 1.

First of all, a fuel for combustion is fed via the fuel-introducing passageway $20_1$ to the combustion radiation portion 12 of the reformer 10 so as to allow the fuel to burn together with air, thereby heating the interior of reaction tube 11 up to a sufficiently high temperature (for example, 850–900° C.). This heating of the reaction tube 11 is effected since this reforming reaction at the reformer 10 is an endothermic reaction. The combustion exhaust gas containing carbon dioxide and generated at this combustion radiation portion 12 is allowed to flow via the convection portion 13 into the chimney 14. As the combustion exhaust gas passes through the convection portion 13, the combustion exhaust gas is heat-exchanged with the after-mentioned steam-containing natural gas passing through the raw gas-introducing passageway $20_2$, with carbon dioxide passing through the carbon dioxide-introducing passageway $20_4$, and also with boiler water passing through the passageway $20_9$, thereby cooling the combustion exhaust gas. The combustion exhaust gas thus cooled is then allowed to be discharged into air atmosphere through the chimney 14.

Natural gas containing methane as a main component is fed to the raw gas-introducing passageway $20_2$. At this moment, steam is added via the steam-introducing passageway $20_3$ to the natural gas at a predetermined ratio to prepare a stream-containing natural gas. By the way, as for this steam, the steam that has been generated through a heat exchange between the boiler water and the synthesis gas at the heat exchanger 32 (to be explained hereinafter) as well as the steam that has been generated through a heat exchange between the boiler water and the combustion exhaust gas at the convection portion 13 of reformer 10 can be utilized for instance.

The steam-containing natural gas is allowed to flow inside the raw gas-introducing passageway $20_2$ and preheated (up to a temperature which would not decompose hydrocarbons of $C_2$ or more existing in the natural gas, e.g. preheated up to 400 to 550° C. for example) as this steam-containing natural gas passes through the convection portion 13 of reformer 10, after which this steam-containing natural gas thus heated is fed to the reaction tube 11 which has been heated up to a sufficiently high temperature. The carbon dioxide is allowed to flow through the carbon dioxide-introducing passageway $20_4$ which is communicated, via a region of the convection portion 13 in the vicinity of the combustion radiation portion 12, with the raw gas-introducing passageway $20_2$ as mentioned above. As a result, the carbon dioxide is preheated up to a temperature of 550 to 650° C. which is higher than the temperature of the aforementioned steam-containing natural gas during the time when the carbon dioxide passes through the convection portion 13 of the reformer 10. Since this carbon dioxide preheated is fed to a region of the raw gas-introducing passageway $20_2$ which is located close to the inlet port of the reaction tube 11 so as to be mixed with the aforementioned steam-containing natural gas, a natural gas which is mixed with carbon dioxide and steam and heated up to a higher temperature can be fed to the reaction tube 11.

The mixed gas comprising natural gas containing methane ($CH_4$) as a main component, steam and carbon dioxide, which has been fed to the reaction tube 11 of the reformer 10 is then subjected to steam reforming process wherein methane is mainly steam-reformed under the presence of a catalyst disposed inside the reaction tube 11, thereby manufacturing a synthesis gas containing hydrogen gas, carbon monoxide and carbon dioxide with a molar ratio of $H_2/CO$ ranging from 1 to 2.5 according to the following formulas (1) and (2).

(1)

(2)

In these formulas (1) and (2) of the reforming reaction, 4 moles of hydrogen and one mole of carbon dioxide can be produced through the reaction between one mole of methane and 2 moles of steam. In the actual reaction system however, a composition which is close to a chemical equilibrium composition that can be determined by the temperature and pressure at the outlet of the reaction tube can be obtained.

By the way, it would be preferable, on the occasion of adding steam and carbon dioxide to the natural gas, to set the contents of methane of the natural gas, steam and carbon dioxide to such that the molar ratio between methane ($CH_4$) and stream ($H_2O$) falls within the range of: $CH_4:H_2O=1:1.5$ to 1:3; while the molar ratio between methane ($CH_4$) and carbon dioxide ($CO_2$) falls within the range of: $CH_4:CO_2=$ 1:1 to 1:3.

The synthesis gas thus obtained is fed via the passageway $20_5$ to the heat exchanger 32 to thereby heat the boiler water flowing through the passageway $20_6$ to generate a high-pressure steam. Concurrently, the synthesis gas itself is cooled and then, fed to the gas-liquid separator 31, in which water is separated from the synthesis gas, the water thus separated being subsequently discharged outside the system through a passageway $20_7$. The synthesis gas thus obtained is then transferred via the passageway $20_8$ to the Fisher-Tropsch (FT) reaction system 33 which is filled with a cobalt-based catalyst for instance, thereby allowing the hydrogen and carbon monoxide all included in the synthesis gas to react with each other, thus synthesizing gasoline, kerosene and gas oil.

According to this first Embodiment, the reformer 10 is designed such that it comprises the reaction tube 11, the combustion radiation portion 12 for heating the reaction tube 11 through the combustion of fuel with air, and the convection portion 13 communicating with the combustion radiation portion 12. In this case, on the occasion of feeding a steam-containing natural gas and carbon dioxide to the reaction tube 11 after preheating it at the convection portion 13 of the reformer 10, the steam-containing natural gas and the carbon dioxide are fed through separate passageways respectively, i.e. the steam-containing natural gas is fed through the raw gas-introducing passageway $20_2$ which is connected, after passing through the convection portion 13 of the reformer 10, with the reaction tube 11, while the carbon dioxide is fed through the carbon dioxide-introducing passageway $20_4$ which is connected, after passing through a specific region of the convection portion 13 of the reformer 10 (particularly, a high temperature region of the convection portion 13 which is located close to the combustion radiation portion 12), with the raw gas-introducing passageway $20_2$, resulting in that the flow of natural gas mixed with steam and the flow of carbon dioxide are combined in the vicinity of the inlet port of the reaction tube 11. As a result, the preheating of carbon dioxide being fed through the carbon dioxide-introducing passageway $20_4$ at the convection portion 13 can be performed so as to permit the carbon dioxide to be heated up to a sufficiently high temperature without worrying about the decomposition of hydrocarbons of $C_2$ or more in the natural gas that may be occurred when a natural gas mixed with both steam and carbon dioxide is attempted to be preheated at the convection portion 13. Therefore, it is now possible to feed a natural gas mixed with steam and carbon dioxide to the reaction tube of the reformer under a condition where the natural gas has been preheated up to a high temperature, while making it possible to inhibit or prevent the hydrocarbons of $C_2$ or more in the natural gas from being decomposed. As a result, since the quantity of fuel to be fed to the combustion radiation portion 12 of the reformer 10 can be reduced, the reaction among a natural gas (mainly methane in the natural gas), steam and carbon dioxide can be effectively carried out in the reaction tube with the employment of minimum quantity of fuel, thereby producing a synthesis gas containing CO and $H_2$. Namely, the fuel consumption by the reformer can be minimized.

Additionally, since not only the raw gas-introducing passageway $20_2$ but also the carbon dioxide-introducing passageway $20_4$ is allowed to pass through the convection portion 13 of the reformer 10 (specifically, a region of the convection portion 13 which is close to the combustion radiation portion 12) so as to enable the carbon dioxide to be preheated during the passage of the carbon dioxide through the carbon dioxide-introducing passageway $20_4$, the exhaust heat of the reformer 10 can be effectively utilized.

This synthesis gas comprising CO and $H_2$ can be fed to the Fisher-Tropsch (FT) reaction system 33 which is filled with a cobalt-based catalyst for instance, thereby allowing the hydrogen and carbon monoxide all included in the synthesis gas to react with each other, thus making it possible to synthesize gasoline, kerosene and gas oil.

Therefore, it is now possible to save the quantity of fuel to be fed to the combustion radiation portion of reformer and to effectively utilize the exhaust heat of the reformer on the occasion of manufacturing a synthesis gas comprising CO and $H_2$ which is suited for synthesizing gasoline, kerosene and gas oil by means of, for example, the Fisher-Tropsch (FT) reaction system by feeding steam-containing natural gas and carbon dioxide to the reformer.

(Second Embodiment)

FIG. 2 is a flow chart illustrating a main portion of the synthesizing plant of gasoline, kerosene and gas oil, which can be employed in the manufacture of a synthesis gas according to the second Embodiment. In this FIG. 2, the same components as employed in the aforementioned FIG. 1 are identified by the same numbers, thereby omitting the explanation thereof.

This synthesizing plant is featured in that a carbon dioxide recovery device 34 is disposed at the convection portion 13 of the reformer 10, thereby enabling carbon dioxide to be recovered from the combustion exhaust gas of the convection portion 13. This carbon dioxide recovery device 34 is connected via the passageway $20_{10}$ with a compressor 35. This compressor 35 is communicated, via a carbon dioxide-introducing passageway $20_{11}$ which is disposed so as to pass through a region of the convection portion 13 in the vicinity of the combustion radiation portion 12 of the reformer 10 (i.e. a high temperature region within the convection portion 13), with a portion of the raw gas-introducing passageway $20_2$ which is located downstream relative to the convection portion 13 with which the raw gas-introducing passageway $20_2$ is intersected. Preferably, this carbon dioxide-introducing passageway $20_{11}$ is disposed so as to be communicated with a portion of the raw gas-introducing passageway $20_2$ which is located in the vicinity of the inlet port of the reaction tube 11.

Next, the method of manufacturing a synthesis gas will be explained with reference to the synthesizing plant shown in FIG. 2.

First of all, a fuel for combustion is fed via the fuel-introducing passageway $20_1$ to the combustion radiation portion 12 of the reformer 10 so as to allow the fuel to burn together with air, thereby heating the interior of reaction tube 11 up to a sufficiently high temperature (for example, 850–900° C.). This heating of the reaction tube 11 is effected since this reforming reaction at the reformer 10 is an endothermic reaction. The combustion exhaust gas containing carbon dioxide and generated at this combustion radiation portion 12 is allowed to flow via the convection portion 13 into the chimney 14. As the combustion exhaust gas passes through the convection portion 13, the combustion exhaust gas is heat-exchanged with the after-mentioned steam-containing natural gas passing through the raw gas-introducing passageway $20_2$, with carbon dioxide passing through the carbon dioxide-introducing passageway $20_{11}$, and also with boiler water passing through the passageway $20_9$, thereby cooling the combustion exhaust gas. The carbon dioxide contained in the combustion exhaust gas thus cooled is recovered by the carbon dioxide recovery device and then, fed via the passageway $20_{10}$ to the compressor 35. The combustion exhaust gas from which carbon dioxide is removed is then allowed to be discharged into air atmosphere through the chimney 14.

Natural gas containing methane as a main component is fed to the raw gas-introducing passageway $20_2$. At this moment, steam is added via the steam-introducing passageway $20_3$ to the natural gas at a predetermined ratio to prepare a steam-containing natural gas. By the way, as for this steam, the steam that has been generated through a heat exchange between the boiler water and the synthesis gas at the heat exchanger 32 (to be explained hereinafter) as well as the steam that has been generated through a heat exchange between the boiler water and the combustion exhaust gas at the convection portion 13 of reformer 10 can be utilized for instance.

The steam-containing natural gas is allowed to flow inside the raw gas-introducing passageway $20_2$ and preheated (up to a temperature which would not decompose hydrocarbons of $C_2$ or more existing in the natural gas, e.g. preheated up to 400 to 550° C. for example) as this steam-containing natural gas passes through the convection portion 13 of reformer 10, after which this mixed natural gas thus heated is fed to the reaction tube 11 which has been heated up to a sufficiently high temperature. The carbon dioxide pressurized by the compressor 35 is allowed to flow through the carbon dioxide-introducing passageway $20_{11}$ which is communicated, after passing through a region of the convection portion 13 in the vicinity of the combustion radiation portion 12, with the raw gas-introducing passageway $20_2$ as mentioned above. As a result, the carbon dioxide is preheated up to a temperature of 550 to 650° C. which is higher than the temperature of the aforementioned steam-containing natural gas during the time when the carbon dioxide passes through the convection portion 13 of the reformer 10. Since this preheated carbon dioxide is fed to a region of the raw gas-introducing passageway $20_2$ which is located close to the inlet port of the reaction tube 11 so as to be mixed with the aforementioned steam-containing natural gas, a natural gas which is mixed with carbon dioxide and steam and heated up to a higher temperature can be fed to the reaction tube 11.

The mixed gas comprising natural gas containing methane ($CH_4$) as a main component, steam and carbon dioxide, which has been fed to the reaction tube 11 of the reformer 10 is then subjected to steam reforming process wherein methane is mainly steam-reformed under the presence of a catalyst disposed inside the reaction tube 11, thereby manufacturing a synthesis gas containing hydrogen gas, carbon monoxide and carbon dioxide with a molar ratio of $H_2/CO$ ranging from 1 to 2.5 according to the aforementioned formulas (1) and (2).

By the way, it would be preferable, on the occasion of adding steam and carbon dioxide to the natural gas, to set the contents of methane of the natural gas, steam and carbon dioxide to such that the molar ratio between methane ($CH_4$) and stream ($H_2O$) falls within the range of: $CH_4:H_2O=1:1.5$ to 1:3; while the molar ratio between methane ($CH_4$) and carbon dioxide ($CO_2$) falls within the range of: $CH_4:CO_2=1:1$ to 1:3.

The synthesis gas thus obtained is fed via the passageway $20_5$ to the heat exchanger 32 to thereby heat the boiler water flowing through the passageway $20_6$ to generate a high-pressure steam. Concurrently, the synthesis gas itself is cooled and then, fed to the gas-liquid separator 31, in which water is separated from the synthesis gas, the water thus separated being subsequently discharged outside the system through a passageway $20_7$. The synthesis gas thus obtained is then transferred via the passageway $20_8$ to the Fisher-Tropsch (FT) reaction system 33 which is filled with a cobalt-based catalyst for instance, thereby allowing the hydrogen and carbon monoxide all included in the synthesis gas to react with each other, thus synthesizing gasoline, kerosene and gas oil.

According to this second Embodiment, it is now possible in the same manner as in the case of the first Embodiment to save the quantity of fuel to be fed to the combustion radiation portion of reformer and to effectively utilize the exhaust heat of the reformer on the occasion of manufacturing a synthesis gas comprising CO and $H_2$ which is suited for synthesizing gasoline, kerosene and gas oil by means of, for example, the Fisher-Tropsch (FT) reaction system by feeding steam-containing natural gas and carbon dioxide to the reformer.

Furthermore, since it is possible to procure carbon dioxide without necessitating any other carbon dioxide source because of the fact that the carbon dioxide generated inside the manufacturing plant (mainly the reformer) of synthesis gas which includes the Fisher-Tropsch reaction system can be recovered, and the carbon monoxide thus recovered can be added, after being preheated, to the steam-containing natural gas at a location on the upstream side of the reformer so as to be utilized as a raw material gas for the reformed gas, a synthesis gas comprising hydrogen gas and carbon monoxide at a molar ratio of $H_2/CO$ which is suited for synthesizing gasoline, kerosene and gas oil by way of the Fisher-Tropsch reaction system can be cheaply manufactured at any place without being restricted by the location of $CO_2$ gas source such as an ammonia plant. Moreover, it becomes possible to suppress carbon dioxide, which is deemed to be a cause for the warm-up of the globe, from being discharged outside the manufacturing plant.

(Third Embodiment)

FIG. 3 is a flow chart illustrating a main portion of the synthesizing plant of gasoline, kerosene and gas oil, which can be employed in the manufacture of a synthesis gas according to the third Embodiment. In this FIG. 3, the same components as employed in the aforementioned FIG. 1 are identified by the same numbers, thereby omitting the explanation thereof.

This synthesizing plant is featured in that a carbon dioxide recovery device 36 is attached to the passageway $20_5$ which is interposed between the heat exchanger 32 and the gas-liquid separator 31. This carbon dioxide recovery device 36 is connected via the passageway $20_{12}$ with a compressor 35. This compressor 35 is communicated, via a carbon dioxide-introducing passageway $20_{11}$ which is disposed so as to pass through a region of the convection portion 13 in the vicinity of the combustion radiation portion 12 of the reformer 10 (i.e. a high temperature region within the convection portion 13), with a portion of the raw gas-introducing passageway $20_2$ which is located downstream relative to the convection portion 13 with which the raw gas-introducing passageway $20_2$ is intersected. Preferably, this carbon dioxide-introducing passageway $20_{11}$ is disposed so as to be communicated with a portion of the raw gas-introducing passageway $20_2$ which is located in the vicinity of the inlet port of the reaction tube 11.

Next, the method of manufacturing a synthesis gas will be explained with reference to the synthesizing plant shown in FIG. 3.

First of all, a fuel for combustion is fed via the fuel-introducing passageway $20_1$ to the combustion radiation portion 12 of the reformer 10 so as to allow the fuel to burn together with air, thereby heating the interior of reaction tube 11 up to a sufficiently high temperature (for example, 850–900° C.). This heating of the reaction tube 11 is effected since this reforming reaction at the reformer 10 is an endothermic reaction. The combustion exhaust gas containing carbon dioxide and generated at this combustion radiation portion 12 is allowed to flow via the convection portion 13 into the chimney 14. As the combustion exhaust gas passes through the convection portion 13, the combustion exhaust gas is heat-exchanged with the after-mentioned steam-containing natural gas passing through the raw gas-introducing passageway $20_2$, with carbon dioxide passing through the carbon dioxide-introducing passageway $20_{11}$, and also with boiler water passing through the passageway $20_9$, thereby cooling the combustion exhaust gas. The combustion exhaust gas thus cooled is then allowed to be discharged into air atmosphere through the chimney 14.

Natural gas containing methane as a main component is fed to the raw gas-introducing passageway $20_2$. At this moment, steam is added via the steam-introducing passageway $20_3$ to the natural gas at a predetermined ratio to prepare a steam-containing natural gas. By the way, as for this steam, the steam that has been generated through a heat exchange between the boiler water and the synthesis gas at the heat exchanger 32 (to be explained hereinafter) as well as the steam that has been generated through a heat exchange between the boiler water and the combustion exhaust gas at the convection portion 13 of reformer 10 can be utilized for instance.

The steam-containing natural gas is allowed to flow inside the raw gas-introducing passageway $20_2$ and preheated (up to a temperature which would not decompose hydrocarbons of $C_2$ or more existing in the natural gas, e.g. preheated up to 400 to 550° C. for example) as this steam-containing natural gas passes through the convection portion 13 of reformer 10, after which this mixed natural gas thus heated is fed to the reaction tube 11 which has been heated up to a sufficiently high temperature. The carbon dioxide that has been recovered from the synthesis gas by means of a carbon dioxide recovery device 36 (to be explained hereinafter) is then fed via the passageway $20_{12}$ to the compressor 35 so as to be pressurized. The carbon dioxide thus pressurized is allowed, together with the carbon dioxide that has been supplemented from the passageway $20_{13}$, to flow through the carbon dioxide-introducing passageway $20_{11}$ which is communicated, after passing through a region of the convection portion 13 in the vicinity of the combustion radiation portion 12, with the raw gas-introducing passageway $20_2$ as mentioned above. As a result, the carbon dioxide is preheated up to a temperature of 550 to 650° C. which is higher than the temperature of the aforementioned steam-containing natural gas during the time when the carbon dioxide passes through the convection portion 13 of the reformer 10. Since this preheated carbon dioxide is fed to a region of the raw gas-introducing passageway $20_2$ which is located close to the inlet port of the reaction tube 11 so as to be mixed with the aforementioned steam-containing natural gas, a natural gas which is mixed with carbon dioxide and steam and heated up to a higher temperature can be fed to the reaction tube 11.

The mixed gas comprising natural gas containing methane ($CH_4$) as a main component, steam and carbon dioxide, which has been fed to the reaction tube 11 of the reformer 10 is then subjected to steam reforming process wherein methane is mainly steam-reformed under the presence of a catalyst disposed inside the reaction tube 11, thereby manufacturing a synthesis gas containing hydrogen gas, carbon monoxide and carbon dioxide with a molar ratio of $H_2/CO$ ranging from 1 to 2.5 according to the aforementioned formulas (1) and (2).

By the way, it would be preferable, on the occasion of adding steam and carbon dioxide to the natural gas, to set the contents of methane of the natural gas, steam and carbon dioxide to such that the molar ratio between methane ($CH_4$) and stream ($H_2O$) falls within the range of: $CH_4:H_2O=1:1.5$ to 1:3; while the molar ratio between methane ($CH_4$) and carbon dioxide ($CO_2$) falls within the range of: $CH_4:CO_2=$ 1:1 to 1:3.

The synthesis gas thus obtained is fed via the passageway $20_5$ to the heat exchanger 32 to thereby heat the boiler water flowing through the passageway $20_6$ to generate a high-pressure steam. Concurrently, the synthesis gas itself is cooled and then, fed to the carbon dioxide recovery device 36, from which carbon dioxide will be recovered. The carbon dioxide thus recovered is fed via the passageway $20_{12}$ to the compressor 35. The carbon dioxide thus pressurized by the compressor 35 is fed together with the steam-containing natural gas to the reaction tube 11. The synthesis gas from which the carbon dioxide has been separated is fed to the gas-liquid separator 31, in which water is separated from the synthesis gas, the water thus separated being subsequently discharged outside the system through a passageway $20_7$. The synthesis gas thus obtained is then transferred via the passageway $20_8$ to the Fisher-Tropsch (FT) reaction system 33 which is filled with a cobalt-based catalyst for instance, thereby allowing the hydrogen and carbon monoxide all included in the synthesis gas to react with each other, thus synthesizing gasoline, kerosene and gas oil.

According to this third Embodiment, it is now possible in the same manner as in the case of the first Embodiment to save the quantity of fuel to be fed to the combustion radiation portion of reformer and to effectively utilize the exhaust heat of the reformer on the occasion of manufacturing a synthesis gas comprising CO and $H_2$ which is suited for synthesizing gasoline, kerosene and gas oil by means of, for example, the Fisher-Tropsch (FT) reaction system by feeding steam-containing natural gas and carbon dioxide to the reformer.

Furthermore, since the carbon dioxide existing in the synthesis gas is recovered so as to be added, after being preheated together with the carbon dioxide that has been separately supplemented, to the steam-containing natural gas at a location on the upstream side of the reformer so as to be utilized as a raw material gas for the reformed gas, the quantity of carbon dioxide to be procured can be reduced as compared with the method where carbon dioxide produced in a separate plant is utilized as a raw material gas. Moreover, it becomes possible to suppress or prevent carbon dioxide, which is deemed to be a cause for the warm-up of the globe, from being discharged outside the manufacturing plant.

(Fourth Embodiment)

FIG. 4 is a flow chart illustrating a main portion of the synthesizing plant of gasoline, kerosene and gas oil, which can be employed in the manufacture of a synthesis gas according to the fourth Embodiment. In this FIG. 4, the same components as employed in the aforementioned FIG. 1 are identified by the same numbers, thereby omitting the explanation thereof.

This synthesizing plant is featured in that a preliminary reformer 37 is disposed on the upstream side of the reformer 10. The raw gas-introducing passageway $20_2$ is communicated with a top portion of the preliminary reformer 37. This preliminary reformer 37 is communicated via the passageway $20_{14}$ with an upper end of the reaction tube 11 of the reformer 10. This passageway $20_{14}$ is communicated via the convection portion 13 of the reformer 10 with the reaction tube 11. The carbon dioxide-introducing passageway $20_4$ is communicated, after passing through a region of the convection portion 13 in the vicinity of the combustion radiation portion 12 of the reformer 10 (i.e. a high temperature region within the convection portion 13), with a portion of the passageway $20_{14}$ which is located downstream relative to the convection portion 13 with which the passageway $20_{14}$ is intersected. Preferably, this carbon dioxide-introducing passageway $20_4$ is disposed so as to be communicated with a portion of the passageway $20_{14}$ which is located in the vicinity of the inlet port of the reaction tube 11.

Next, the method of manufacturing a synthesis gas will be explained with reference to the synthesizing plant shown in FIG. 4.

First of all, a fuel for combustion is fed via the fuel-introducing passageway $20_1$ to the combustion radiation portion 12 of the reformer 10 so as to allow the fuel to burn together with air, thereby heating the interior of reaction tube 11 up to a sufficiently high temperature (for example, 850–900° C.). This heating of the reaction tube 11 is effected since this reforming reaction at the reformer 10 is an endothermic reaction. The combustion exhaust gas containing carbon dioxide and generated at this combustion radiation portion 12 is allowed to flow via the convection portion 13 into the chimney 14. As the combustion exhaust gas passes through the convection portion 13, the combustion exhaust gas is heat-exchanged with the after-mentioned steam-containing natural gas flowing through the raw gas-introducing passageway $20_2$, with steam-containing natural gas reformed preliminarily and passing through the passageway $20_{14}$, with carbon dioxide passing through the carbon dioxide-introducing passageway $20_4$, and also with boiler water passing through the passageway $20_9$, thereby cooling the combustion exhaust gas. The combustion exhaust gas thus cooled is then allowed to be discharged into air atmosphere through the chimney 14.

Natural gas containing methane as a main component is fed to the raw gas-introducing passageway $20_2$. At this moment, steam is added via the steam-introducing passageway $20_3$ to the natural gas at a predetermined ratio to prepare a steam-containing natural gas. By the way, as for this steam, the steam that has been generated through a heat exchange between the boiler water and the synthesis gas at the heat exchanger 32 (to be explained hereinafter) as well as the steam that has been generated through a heat exchange between the boiler water and the combustion exhaust gas at the convection portion 13 of reformer 10 can be utilized for instance.

The steam-containing natural gas is allowed to flow inside the raw gas-introducing passageway $20_2$ and preheated (up to a temperature which would not decompose hydrocarbons of $C_2$ or more existing in the natural gas, e.g. preheated up to 400 to 550° C. for example) as this mixed natural gas passes through the convection portion 13 of reformer 10, after which this steam-containing natural gas thus heated is fed to a preliminary reformer 37. In this preliminary reformer 37, the hydrocarbons of the natural gas which have two or more carbon atoms, mainly ethane, are reformed into methane having one carbon atom (C1), CO and $H_2$.

The steam-containing natural gas preliminarily reformed in this manner is then fed via the passageway $20_{14}$ to the reaction tube 11 of the reformer 10. The carbon dioxide is allowed to flow through the carbon dioxide-introducing passageway $20_4$ which is communicated, after passing through a region of the convection portion 13 in the vicinity of the combustion radiation portion 12, with the raw gas-introducing passageway $20_2$. As a result, the carbon dioxide is preheated up to a temperature of 550 to 650° C. which is higher than the temperature of the aforementioned steam-containing natural gas during the time when the carbon dioxide passes through the convection portion 13 of the reformer 10. Since this preheated carbon dioxide is fed to a region of the passageway $20_{14}$ which is located close to the inlet port of the reaction tube 11 so as to be mixed with the aforementioned steam-containing natural gas, a natural gas which is mixed with carbon dioxide and steam and heated up to a higher temperature can be fed to the reaction tube 11.

The mixed gas comprising natural gas containing methane ($CH_4$) as a main component, steam and carbon dioxide, which has been fed to the reaction tube 11 of the reformer 10 is then subjected to steam reforming process wherein methane is mainly steam-reformed under the presence of a catalyst disposed inside the reaction tube 11, thereby manufacturing a synthesis gas containing hydrogen gas, carbon monoxide and carbon dioxide with a molar ratio of $H_2/CO$ ranging from 1 to 2.5 according to the aforementioned formulas (1) and (2).

In these formulas (1) and (2) of the reforming reaction, 4 moles of hydrogen and one mole of carbon dioxide can be produced through the reaction between one mole of methane and 2 moles of steam. In the actual reaction system however, a composition which is close to a chemical equilibrium composition that can be determined by the temperature and pressure at the outlet of the reaction tube 11 can be obtained.

By the way, it would be preferable, on the occasion of adding steam and carbon dioxide to the natural gas, to set the contents of methane of the natural gas, steam and carbon dioxide to such that the molar ratio between methane ($CH_4$) and stream ($H_2O$) falls within the range of: $CH_4:H_2O=1:1.5$ to 1:3; while the molar ratio between methane ($CH_4$) and carbon dioxide ($CO_2$) falls within the range of: $CH_4:CO_2=$ 1:1 to 1:3.

The synthesis gas thus obtained is fed via the passageway $20_5$ to the heat exchanger 32 to thereby heat the boiler water flowing through the passageway $20_6$ to generate a high-pressure steam. Concurrently, the synthesis gas itself is cooled and then, fed to the gas-liquid separator 31, in which water is separated from the synthesis gas, the water thus separated being subsequently discharged outside the system through a passageway $20_7$. The synthesis gas thus obtained is then transferred via the passageway $20_8$ to the Fisher-Tropsch (FT) reaction system 33 which is filled with a cobalt-based catalyst for instance, thereby allowing the hydrogen and carbon monoxide all included in the synthesis gas to react with each other, thus synthesizing gasoline, kerosene and gas oil.

According to this fourth Embodiment, it is now possible in the same manner as in the case of the first Embodiment to save the quantity of fuel to be fed to the combustion radiation portion of reformer and to effectively utilize the exhaust heat of the reformer on the occasion of manufacturing a synthesis gas comprising CO and $H_2$ which is suited for synthesizing gasoline, kerosene and gas oil by means of, for example, the Fisher-Tropsch (FT) reaction system by feeding steam-containing natural gas and carbon dioxide to the reformer.

Additionally, since the preliminary reformer 37 is disposed on the upstream side of the reformer 10 to thereby make it possible to preliminarily reform the hydrocarbons of the natural gas which have two or more carbon atoms, mainly ethane, into methane having one carbon atom, CO and $H_2$, it is possible to alleviate the thermal load at the reformer 10. As a result, the quantity of fuel to be fed to the combustion radiation portion 12 of the reformer 10 can be reduced, thus making it possible to manufacture a synthesis gas with a decreased quantity of fuel.

(Fifth Embodiment)

FIG. 5 is a flow chart illustrating a main portion of the synthesizing plant of gasoline, kerosene and gas oil, which can be employed in the manufacture of a synthesis gas according to the fifth Embodiment. In this FIG. 5, the same components as employed in the aforementioned FIG. 1 are identified by the same numbers, thereby omitting the explanation thereof.

This synthesizing plant is featured in that a partial oxidation furnace 38 is provided at a region of the passageway $20_5$ which is located on the downstream side of the reformer 10 and between a lower end of the reaction tube 11 and the heat exchanger 32. A gas-introducing (oxygen-introducing) passageway $20_{15}$ is communicated with the partial oxidation furnace 38.

Next, the method of manufacturing a synthesis gas will be explained with reference to the synthesizing plant shown in FIG. 5.

First of all, a fuel for combustion is fed via the fuel-introducing passageway $20_1$ to the combustion radiation portion 12 of the reformer 10 so as to allow the fuel to burn together with air, thereby heating the interior of reaction tube 11 up to a sufficiently high temperature (for example, 850–900° C.). This heating of the reaction tube 11 is effected since this reforming reaction at the reformer 10 is an endothermic reaction. The combustion exhaust gas containing carbon dioxide and generated at this combustion radiation portion 12 is allowed to flow via the convection portion 13 into the chimney 14. As the combustion exhaust gas passes through the convection portion 13, the combustion exhaust gas is heat-exchanged with the after-mentioned steam-containing natural gas passing through the raw gas-introducing passageway $20_2$, with carbon dioxide passing through the carbon dioxide-introducing passageway $20_4$, and also with boiler water passing through the passageway $20_9$, thereby cooling the combustion exhaust gas. The combustion exhaust gas thus cooled is then allowed to be discharged into air atmosphere through the chimney 14.

Natural gas containing methane as a main component is fed to the raw gas-introducing passageway $20_2$. At this moment, steam is added via the steam-introducing passageway $20_3$ to the natural gas at a predetermined ratio to prepare a steam-containing natural gas. By the way, as for this steam, the steam that has been generated through a heat exchange between the boiler water and the synthesis gas at the heat exchanger 32 (to be explained hereinafter) as well as the steam that has been generated through a heat exchange between the boiler water and the combustion exhaust gas at the convection portion 13 of reformer 10 can be utilized for instance.

The steam-containing natural gas is allowed to flow inside the raw gas-introducing passageway $20_2$ and preheated (up to a temperature which would not decompose hydrocarbons of $C_2$ or more existing in the natural gas, e.g. preheated up to 400 to 550° C. for example) as this steam-containing natural gas passes through the convection portion 13 of reformer 10, after which this mixed natural gas thus preheated is fed to the reaction tube 11 of the reformer 10. The carbon dioxide is allowed to flow through the carbon dioxide-introducing passageway $20_4$ which is communicated, after passing through a region of the convection portion 13 in the vicinity of the combustion radiation portion 12, with the raw gas-introducing passageway $20_2$. As a result, the carbon dioxide is preheated up to a temperature of 550 to 650° C. which is higher than the temperature of the aforementioned steam-containing natural gas during the time when the carbon dioxide passes through the convection portion 13 of the reformer 10. Since this preheated carbon dioxide is fed to a region of the raw gas-introducing passageway $20_2$ which is located close to the inlet port of the reaction tube 11 so as to be mixed with the aforementioned steam-containing natural gas, a natural gas which is mixed with carbon dioxide and steam and heated up to a higher temperature can be fed to the reaction tube 11.

The mixed gas comprising natural gas containing methane ($CH_4$) as a main component, steam and carbon dioxide, which has been fed to the reaction tube 11 of the reformer 10 is then subjected to steam reforming process wherein methane is mainly steam-reformed under the presence of a catalyst disposed inside the reaction tube 11, thereby producing a reformed gas containing hydrogen gas, carbon monoxide and carbon dioxide according to the aforementioned formulas (1) and (2).

In these formulas (1) and (2) of the reforming reaction, 4 moles of hydrogen and one mole of carbon dioxide can be produced through the reaction between one mole of methane and 2 moles of steam. In the actual reaction system however, a composition which is close to a chemical equilibrium composition that can be determined by the temperature and pressure at the outlet of the reaction tube 11 can be obtained.

By the way, it would be preferable, on the occasion of adding steam and carbon dioxide to the natural gas, to set the contents of methane of the natural gas, steam and carbon dioxide to such that the molar ratio between methane ($CH_4$) and stream ($H_2O$) falls within the range of: $CH_4:H_2O=1:1.5$ to 1:3; while the molar ratio between methane ($CH_4$) and carbon dioxide ($CO_2$) falls within the range of: $CH_4:CO_2=$ 1:1 to 1:3.

The reformed gas thus obtained is fed via the passageway $20_5$ to the partial oxidation furnace 38, in which the hydrogen in the reformed gas is allowed to burn by the oxygen that has been introduced therein from the oxygen introducing passageway $20_{15}$. On this occasion, since the reformed gas is heated up to a higher temperature, CO and $H_2$ are caused to be generated according to the aforementioned reaction formula (1). Further, since the quantity of hydrogen in the reformed gas is caused to decrease in the partial oxidation furnace 38, it becomes possible to manufacture a synthesis gas having a molar ratio of $H_2/CO=1$ to 2.5.

The synthesis gas produced at the partial oxidation furnace 38 is fed via the passageway $20_5$ to heat exchanger 32 to thereby heat the boiler water flowing through the passageway $20_6$ to generate a high-pressure steam. Concurrently, the synthesis gas itself is cooled and then, fed to the gas-liquid separator 31. In this gas-liquid separator 31, the synthesis gas is separated from water, the water thus separated being subsequently discharged outside the system through a passageway $20_7$. The synthesis gas thus obtained is then transferred via the passageway $20_8$ to the Fisher-Tropsch (FT) reaction system 33 which is filled with a cobalt-based catalyst for instance, thereby allowing the hydrogen and carbon monoxide all included in the synthesis gas to react with each other, thus synthesizing gasoline, kerosene and gas oil.

According to this fifth Embodiment, the steam-containing natural gas and carbon dioxide is fed to the reformer, and the resultant reformed gas is introduced from the reformer into the partial oxidation furnace, in which the hydrogen contained in the reformed gas is allowed to burn with oxygen separately introduced into the partial oxidation furnace. As a result, it is now possible to manufacture a synthesis gas comprising CO and $H_2$, which is suited for synthesizing gasoline, kerosene and gas oil by means of, for example, the Fisher-Tropsch (FT) reaction system, and also possible to save the quantity of fuel to be fed to the combustion radiation portion of reformer and, at the same time, to effectively utilize the exhaust heat of the reformer.

By the way, the preliminary reformer described in the aforementioned fourth Embodiment may be applied also to the synthesis plants of the aforementioned second and third Embodiments.

Additionally, although the reformed gas and oxygen are fed to the partial oxidation furnace in the aforementioned fifth Embodiment, a mixed gas comprising oxygen and carbon dioxide may be employed in place of them. In this case, carbon dioxide should preferably be incorporated into the mixed gas at ratio of 30 to 200% by volume based on the oxygen. When such a mixed gas comprising oxygen and carbon dioxide is employed, the reaction between hydrogen and oxygen of the reformed gas in the partial oxidation furnace would become slower, thereby making it possible to minimize the possibility of explosion.

It is also possible, in this fifth Embodiment, to supply steam to the partial oxidation furnace. When steam is supplied to the partial oxidation furnace, it would become possible to suppress or prevent the generation of free carbon which would hinder the FT synthesis reaction in the partial oxidation furnace.

The partial oxidation furnace described in the fifth Embodiment may be installed in the synthesis plants of the aforementioned second to fourth Embodiments. In this case, a mixed gas comprising the reformed gas, oxygen and carbon dioxide may be fed to the partial oxidation furnace. It is also possible, in these second to fourth Embodiments, to supply steam to the partial oxidation furnace.

In the first to fifth Embodiments, the synthesis gas manufactured in the reformer is introduced into the Fisher-Tropsch reaction system so as to synthesize gasoline, etc. However, the synthesis gas manufactured in the reformer can be also applied to the synthesis of methanol or dimethyl ether.

As explained above, it is possible according to this invention to feed steam-containing natural gas and carbon dioxide and preheated to a high temperature to a reformer to thereby reduce the fuel consumption at the reformer, and also to effectively utilize the exhaust heat generated at the reformer. Namely, it is possible according to this invention to provide a method of manufacturing a synthesis gas which is suited for the synthesis of gasoline, kerosene and gas oil by way of the Fisher-Tropsch reaction system, or for the synthesis of methanol or dimethyl ether at low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a synthesis gas by using a synthesis plant comprising a reformer having a steam reforming reaction tube, a combustion radiation portion provided around said reaction tube, for heating said reaction tube by combusting fuel, and a convection portion communicating said combustion radiation portion, said method comprising the steps of;

adding steam to a natural gas to prepare a stream-containing natural gas;

passing the stream-containing natural gas through the convection portion of the reformer, thereby preheating the stream-containing natural gas;

preheating carbon dioxide by passing said carbon dioxide through said convection portion of said reformer; and feeding said stream-containing natural gas preheated and said carbon dioxide preheated to said reaction tube, thereby producing a synthesis gas containing hydrogen and carbon monoxide.

2. The method according to claim 1, wherein said carbon dioxide is recovered from the combustion waste gas generated at said combustion radiation portion of said reformer.

3. The method according to claim 1, wherein said carbon dioxide is recovered from the synthesis gas produced on a downstream side of said reformer.

4. A method of manufacturing a synthesis gas by using a synthesis plant comprising a reformer and a preliminary reformer which is provided on the upstream side of said reformer, said reformer comprising a steam reforming reaction tube, a combustion radiation portion provided around said reaction tube, for heating said reaction tube by combusting fuel, and a convection portion communicating said combustion radiation portion, and said method comprising the steps of;

adding steam to a natural gas to prepare a stream-containing natural gas;

passing said stream-containing natural gas through said convection portion of said reformer, thereby preheating said stream-containing natural gas;

feeding said stream-containing natural gas preheated via said preliminary reformer to said reaction tube;

preheating carbon dioxide by passing said carbon dioxide through said convection portion of said reformer; and feeding said carbon dioxide preheated via a passageway, which is located between said reaction tube and said preliminary reformer and passed said stream-containing natural gas preheated, to said reaction tube, thereby producing a synthesis gas containing hydrogen and carbon monoxide.

5. The method according to claim 4, wherein said carbon dioxide is recovered from the combustion waste gas generated at said combustion radiation portion of said reformer.

6. The method according to claim 4, wherein said carbon dioxide is recovered from the synthesis gas produced on a downstream side of said reformer.

7. A method of manufacturing a synthesis gas by using a synthesis plant comprising a reformer and a partial oxidation furnace which is provided on the downstream side of said reformer, said reformer comprising a steam reforming reaction tube, a combustion radiation portion provided around said reaction tube, for heating said reaction tube by combusting fuel, and a convection portion communicating said combustion radiation portion, and said method comprising the steps of;

adding steam to a natural gas to prepare a stream-containing natural gas;

passing the stream-containing natural gas through the convection portion of the reformer, thereby preheating said stream-containing natural gas;

preheating carbon dioxide by passing said carbon dioxide through said convection portion of said reformer;

feeding said stream-containing natural preheated gas and said carbon dioxide preheated to said reaction tube, thereby producing a synthesis gas containing hydrogen and carbon monoxide;

introducing said synthesis gas into said partial oxidation furnace; and introducing gas containing oxygen into said partial oxidation furnace, thereby allowing a reaction to take place between said synthesis gas and said oxygen.

8. The method according to claim 7, wherein said carbon dioxide is recovered from the combustion waste gas generated at said combustion radiation portion of said reformer.

9. The method according to claim 7, wherein said carbon dioxide is recovered from the synthesis gas produced on a downstream side of said reformer.

10. The method according to claim 7, wherein said gas containing oxygen is oxygen.

11. The method according to claim 7, wherein said gas containing oxygen is a mixed gas containing oxygen and carbon dioxide.

12. The method according to claim 7, wherein steam is additionally fed to the partial oxidation furnace.

13. A method of manufacturing a synthesis gas by using a synthesis plant comprising a reformer, a preliminary reformer which is disposed on the upstream side of said reformer, and a partial oxidation furnace which is provided on the downstream side of said reformer, said reformer comprising a steam reforming reaction tube, a combustion radiation portion provided around said reaction tube, for heating said reaction tube by combusting fuel, and a convection portion communicating said combustion radiation portion, and said method comprising the steps of;

adding steam to a natural gas to prepare a stream-containing natural gas;

passing the stream-containing natural gas through the convection portion of the reformer, thereby preheating said stream-containing natural gas;

feeding said stream-containing natural gas preheated via said preliminary reformer to said reaction tube;

preheating carbon dioxide by passing said carbon dioxide through said convection portion of said reformer;

feeding said carbon dioxide preheated via a passageway, which is located between said reaction tube and said preliminary reformer and passed said stream-containing natural gas preheated, to said reaction tube, thereby producing a synthesis gas containing hydrogen and carbon monoxide;

introducing said synthesis gas into said partial oxidation furnace; and introducing gas containing oxygen into said partial oxidation furnace, thereby allowing a reaction to take place between said synthesis gas and said oxygen.

14. The method according to claim 13, wherein said carbon dioxide is recovered from the combustion waste gas generated at said combustion radiation portion of the reformer.

15. The method according to claim 13, wherein said carbon dioxide is recovered from said synthesis gas produced on a downstream side of said reformer.

16. The method according to claim 13, wherein said gas containing oxygen is oxygen.

17. The method according to claim 13, wherein said gas containing oxygen is a mixed gas containing oxygen and carbon dioxide.

18. The method according to claim 13, wherein steam is additionally fed to the partial oxidation furnace.

* * * * *